United States Patent [19]

Farber et al.

[11] 4,064,922
[45] * Dec. 27, 1977

[54] PUNCTURE SEALING COMPOSITION AND TIRE

[75] Inventors: Milton Farber, Bethany; Frederick C. Loveless, Cheshire; Robert F. Peterson, Jr., Woodbury, all of Conn.

[73] Assignee: Uniroyal, Inc., New York, N.Y.

[*] Notice: The portion of the term of this patent subsequent to Sept. 21, 1993, has been disclaimed.

[21] Appl. No.: 683,861

[22] Filed: May 6, 1976

Related U.S. Application Data

[63] Continuation-in-part of Ser. No. 557,713, March 12, 1975, Pat. No. 3,981,342.

[51] Int. Cl.² .............................................. B60C 21/08
[52] U.S. Cl. ........................................ 152/347; 106/33; 428/512
[58] Field of Search ............... 152/347, 357, 330 R, 152/348; 106/33; 428/912, 521, 493; 156/272

[56] References Cited

U.S. PATENT DOCUMENTS

| 2,756,801 | 7/1956 | Iknayan et al. | 152/347 |
|---|---|---|---|
| 2,765,018 | 10/1956 | Connell | 152/347 |
| 2,776,699 | 1/1957 | Kindle et al. | 152/347 |
| 2,782,829 | 2/1957 | Peterson et al. | 152/347 |
| 2,802,505 | 8/1957 | Peterson et al. | 152/347 |
| 3,048,509 | 8/1962 | Sweet et al. | 152/347 |
| 3,361,698 | 1/1968 | Pace | 152/347 |
| 3,565,151 | 2/1971 | Courtney | 152/347 |
| 3,628,585 | 12/1971 | Pace | 152/347 |
| 3,933,566 | 1/1976 | Seiberling | 152/357 |
| 3,981,342 | 9/1976 | Farber et al. | 152/347 |

FOREIGN PATENT DOCUMENTS

| 82,796 | 4/1974 | Japan | 152/347 |
|---|---|---|---|

Primary Examiner—Drayton E. Hoffman
Attorney, Agent, or Firm—James J. Long

[57] ABSTRACT

A pneumatic tire of the tubeless type, embodying a layer of puncture sealant composition based on:
A. a major proportion of a low molecular weight elastomer (e.g., depolymerized natural rubber) in admixture with a tackifying or plasticizing substance (e.g., a resinous reaction product of a mineral oil purification residue with formaldehyde) and
B. a minor proportion of a high molecular weight elastomer (e.g., cis-polyisoprene);
containing a crosslinking agent (e.g., tetra-n-butyl titanate) in an amount sufficient to give a partial cure.

33 Claims, 4 Drawing Figures

PUNCTURE SEALING COMPOSITION AND TIRE

This application is a continuation-in-part of our application Ser. No. 557,713, filed Mar. 12, 1975, now U.S. Pat. No. 3,981,342, issued Sept. 21, 1976.

Copending application Ser. No. 557,712 of Frederick C. Loveless filed Mar. 12, 1975, now U.S. Pat. No. 4,012,567 issued Mar. 15, 1977, discloses the crosslinking of elastomers with alkyl titanate esters.

Copending application Ser. No. 557,711 of David Beretta and Robert H. Snyder filed Mar. 12, 1975 discloses a method of repairing tubeless tires utilizing a composition containing a low molecular weight liquid elastomer, a high molecular weight elastomer and a crosslinking agent.

This invention relates to a puncture sealing composition and to a pneumatic tire of the tubeless type embodying a layer of puncture sealant composition based on a mixture of more than 50% low molecular weight liquid rubber, a high molecular weight elastomer, and an amount of crosslinking agent for the mixture, sufficient to give partial crosslinking.

Preferably, the mixture contains one or more tackifying or plasticizing substances which may allow a reduction of the amount of low molecular weight elastomer, but the total of tackifying or plasticizing substance plus low molecular weight elastomer is more than 50% of the mixture.

Puncture sealing tubeless tires have previously been proposed, containing, in the area of the tire normally most subject to punctures (that is, the undertread or the area extending across the crown of the tire at least from one shoulder to the other), a layer of sealant composition which has plastic and adhesive qualities such that the composition tends to stick to a puncturing object, and, when the puncturing object is withdrawn, tends to flow into the opening or puncture, forming a plug which seals the opening against loss of air from the tires. Unfortunately, it has proven difficult to provide a composition which would flow into the puncture hole and yet have sufficient viscosity to prevent it from flowing at elevated temperatures, up to 250° F, such as exist in an automobile pneumatic tire under operating conditions. The problem is complicated by the extreme centrifugal force to which the composition is subjected as the tire rotates at high speed, since such centrifugal force tends to cause the composition to flow into the central crown area, leaving the areas near the shoulders unprotected. Furthermore, it has proven difficult to provide a sealant composition which would retain this desired balance of viscosity, plasticity, adhesion and conformability over an extended period of service.

There are a number of patents that employ unvulcanized, partially vulcanized or fully vulcanized elastomeric layers as puncture sealants in pneumatic tires. Among them are U.S. Pat. Nos. 2,782,829, Peterson et al., Feb. 26, 1957, 2,802,505, Peterson et al., Aug. 13, 1957, and 2,811,190 Iknayan et al., Oct. 29, 1957. Some of these include minor amounts of plasticizers or softeners such as mineral oil, rosin oil, cumarone-indene resins or liquid polybutene. Such materials however, remain in the wholly uncured condition and do not function as essential components of the sealant. The present invention employs major amounts, at least more than 50%, of a liquid elastomer which is an essential part of the sealant mixture and is partially covulcanized with the high molecular weight solid elastomer. The resultant composition is unique in that the high molecular weight partially vulcanized portion serves as a gelled matrix which restrains the low molecular weight portion from flowing at elevated temperature and high centrifugal forces and yet permits sufficient conformability for the composition to function effectively as a puncture sealant.

However, the preferred embodiment of the present invention entails the use of a tackifier and/or plasticizer as an additional component in which case the amount of the liquid rubber may be less than 50% as long as the total tackifier plus liquid rubber is greater than 50%.

U.S. Pat. No. 2,657,729, Hardman, et al., Nov. 3, 1953, discloses a puncture sealant based upon depolymerized rubber and a gelling agent. Unlike the present sealant, the Hardman et al. composition does not include a partially covulcanized high molecular weight solid elastomer.

Japanese Pat. No. 82796/72 of Bridgestone, Apr. 13, 1974, teaches the use of blends of high and low molecular weight elastomers such as EPDM and polybutene, the non-flowing property of which is imparted by the inclusion of short nylon fibers. In one example which describes the use of an envelope to contain the puncture sealant material a small amount, 0.5 phr, of sulfur is added to the composition. This amount of sulfur is insufficient to be operative in the present invention. The present sealant composition, in contrast, contains sufficient curative to produce resistance to flow; fibrous restraint is neither necessary nor desirable in the present composition, which is preferably devoid of fibrous filler.

Accordingly, in the prior art, various elastomers, both cured and uncured, have been proposed as puncture sealants. In the uncured state, although they may function as sealants, they will sometimes tend to "cold flow" or flow at elevated temperatures such as are encountered in tires during use. This flow is undesirable. When they are crosslinked (cured) to prevent flow, these materials sometimes then tend to lose the adhesion and conformability of the uncured state, and no longer act as sealants.

We have found that a mixture of high and low molecular weight elastomer, the latter being present in amount of more than 50% by weight, cured to a limited extent, sufficient to prevent flow under conditions of use, offers novel and unique advantages. The high molecular weight elastomer furnishes rigidity and strength. The low molecular weight elastomer furnishes the adhesion and conformability necessary in a puncture sealant. The tendency to flow is, of course, greatest in the low molecular weight component. By increasing the proportion of high molecular weight component, this tendency can be decreased, but not completely removed. In partially curing the mixture, the crosslinks are more effective in the high molecular weight elastomer, thus allowing it to act as a supporting structure or skeleton to retard flow, without crosslinking the low molecular weight elastomer to the point where its ability to function as sealant would be significantly impaired.

The invention will be described with reference to the accompanying drawing, wherein.

As indicated, the invention is a puncture sealant composition which is a mixture of low molecular weight liquid elastomer with a high molecular weight elastomer the low molecular weight elastomer being present in amount greater than 50% based on the weight of the two polymers, crosslinked to an extent, as measured by gel and Mooney viscosity, which will prevent it from flowing at elevated temperature, yet still possess sufficient adhesion and conformability to function as a sealant. Preferably, a tackifier may be substituted for a portion of the low molecular weight rubber to enhance the adhesion and conformability of the resultant composition.

As the high molecular weight elastomeric component of the sealant composition of the invention there may be employed any high molecular weight solid elastomer capable of being crosslinked. Examples are the highly unsaturated rubbers such as those based on conjugated diolefins, whether homopolymers as in polyisoprene (particularly cis-polyisoprene, whether natural or synthetic), polybutadiene (including polybutadiene of high cis content), polychloroprene (neoprene), or copolymers as exemplified by those having a major proportion of such conjugated dienes as butadiene with a minor proportion of such monoethylenically unsaturated copolymerizable monomers as styrene or acrylonitrile. Alternatively, elastomers of low unsaturation may be used, notably butyl type rubbers (copolymers of such isoolefins as isobutylene with small amounts of conjugated dienes such as isoprene), or EPDM types (copolymers of at least two different monoolefins such as ethylene and propylene with a small amount of a non-conjugated diene such as dicyclopentadiene, 1,4-hexadiene, 5-ethylidene-2-norbornene, etc.). Even saturated elastomers such as EPM or ethylene-vinyl acetate may be employed, using the proper cure system. The elastomer may be emulsion-prepared or solution-prepared, stereo specific or otherwise. The molecular weight of the solid elastomer is usually in excess of 50,000 ordinarily within the range of from 60,000 to 2 to 3 million or more. Ordinarily the solid elastomeric component has a Mooney viscosity within the range of from 20 to 160 ML-4 at 212° F.

The low molecular weight elastomer employed has a molecular weight less than 50,000, usually within the range from 1,000 to 10,000, and is preferably of the "liquid" rubber type with a maximum Brookfield viscosity at 150° F. of 2 million cps. ordinarily within the range of from 20,000 to 1 million cps. Examples are: liquid cis-polyisoprene (e.g., heat depolymerized natural rubber, or cis-polyisoprene polymerized to low molecular weight), liquid polybutadiene, liquid polybutene, liquid EPDM, and liquid butyl rubber. The high molecular weight, elongation and film strength of cis-polyisoprene (both natural and synthetic) and great tackiness of depolymerized cis-polyisoprene give a combination of these two elastomers, when partially cured, according to the present invention, a large degree of resistance to flow, coupled with efficient sealing ability. Other elastomer combinations of the present invention, particularly the saturated ones, offer resistance to oxidation in service which makes them also highly desirable.

The tackifying or plasticizing substances which are preferably included in the composition are low molecular weight materials such as rosin esters (e.g., Staybelite [trademark] Ester 10); aliphatic petroleum hydrocarbon resins (e.g., Piccopale [trademark] A-70); polyterpene resins derived from alpha-pinene (e.g., Piccolyte [trademark] A-10), beta-pinene (e.g., Piccolyte [trademark] S-25); resins made from styrene and related monomers (e.g., Piccolastic [trademark] A-5); resins made from dicyclopentadiene (e.g., Piccodiene [trademark] 2215); and resins from the reaction of a mineral oil purification residue with formaldehyde and with nitric acid catalyst according to U.S. Pat. No. 3,544,494, Schmidt et al., Dec. 1, 1970, sold under the tradename of Struktol [trademark].

The sealant composition of the invention contains a major proportion, that is, between more than 50% and 90% by weight of total low molecular weight material (i.e., low molecular weight elastomer plus low molecular weight tackifier) based on the weight of the two elastomers plus tackifier or plasticizer. The amount of tackifier or plasticizer may range up to 70%, based on the weight of low molecular weight elastomer plus tackifier or plasticizer. The ratio of high to low molecular weight components depends mainly on the molecular weight of the high molecular weight elastomer and other variables such as the particular elastomer involved, the amount and kind of crosslinking agent, and the conditions of the crosslinking treatment. The proportion of the two elastomeric components are chosen so as to give a peak Mooney viscosity at 150° F (the maximum reading attained, which is usually at about 90 seconds of the 4 minute Mooney curve) of between 30 and 55 (large rotor, ML) in the final crosslinked mixture, with a preferred range of 40 to 50. Below the aforementioned initial Mooney viscosity of 30, the composition will tend to flow down from the shoulder and sidewall areas of the tire when it is run at high speed as well as out of the hole when the tire is punctured. Above the said peak Mooney viscosity of 55, the sealant capability of the composition is sufficiently impaired to render it unusable for practical purposes. The Mooney viscosity of the mixture can also be controlled for a given elastomeric composition of the present invention by the amount of the mechanical shearing employed in mixing the constituents. The net effect here, of course, is to break down (i.e., lower) the molecular weight of the high molecular weight component, thereby lowering the Mooney viscosity before cure.

As indicated, for purposes of the invention the mixture further includes a crosslinking agent. The crosslinking agent may be any suitable substance or combination of substances capable of curing or gelling the mixture to the desired extent. Examples are:

1. Sulfur curing systems such as those based on sulfur or sulfur-yielding materials (e.g., tetramethyl thiuram disulfide) and conventional accelerators of sulfur vulcanization.

2. Quinoid curing systems such as p-quinone dioxime (GMF, trademark, Uniroyal Chemical) with or without supplementary oxidant.

3. Organic peroxides (or hydroperoxides) such as dicumyl peroxide, cumene hydroperoxide, methyl ethyl ketone hydroperoxide or other radical generating catalysts such as azobisisobutyronitrile.

4. Polyisocyanates such as MDI (4,4'-methylene bisphenyleneisocyanate), TDI (tolylene diisocyanate), and PAPI (polymethylene polyphenylisocyanate) as well as dimers and trimers of MDI and TDI.

5. Tetrahydrocarbyl titanate esters as described in copending application Ser. No. 557,712 (U.S. Pat. No. 4,012,567) referred to above.

Another coventional way of crosslinking rubber is by electron radiation, illustrated in Example VII herein, which utilizes no added crosslinking agent.

The amount of crosslinking agent employed will vary with the particular elastomers employed and with their proportions, as well as with the particular crosslinking agent and the conditions of the crosslinking step. Ordinarily the amount used is that sufficient to prevent flow of the composition in a tire at temperatures up to 200° F and speeds up to 70 mph, while still retaining sufficient adhesiveness and conformability to perform the described sealant function. The amounts employed will vary depending on the proportion of high molecular weight elastomer in the mixture. Higher proportions of high molecular weight elastomer will require less crosslinking agent and vice-versa to maintain the desired combination of resistance to flow and sealing ability. The amount of crosslinking agent will, of course, vary with the nature of the elastomers themselves. For a depolymerized natural rubber (DPR) natural rubber (NR) mixture, the amount of sulfur-containing or quinoid type curative will be in the range of from more than 0.5 to 2.0 phr (parts per 100 parts by weight of both elastomers added together), ordinarily from 0.7 to 1.5 phr. For this same mixture, with polyisocyanate or hydrocarbyl titanate ester curatives, the amounts required will ordinarily be in the range from about 2 to 10 phr, preferably 2.5 to 8 phr. Similarly, the applicable range for peroxide or hydroperoxide curatives (radical generating catalysts) would be 0.1 to 1.0 phr, preferably 0.2 to 0.7 phr.

The crosslinking of the sealant mixture is accompanied by an increase in viscosity and an increase in the gel content (content of insoluble material). It has been found that for the natural rubber - depolymerized natural rubber mixture, a gel content, as measured in toluene at room temperature, of between 15 to 60% preferably 20 to 50%, by weight, in the crosslinked blend correlates with the desirable combination of sealing ability and lack of flow properties. For other elastomer combinations the range of optimum gel content will vary depending on the molecular weight and proportion of the two elastomeric components. As described previously, a peak Mooney viscosity (ML at 150° F.) of between 30 and 55 of the final cured mixture has been found to correlate with the aforementioned desired combination of properties.

The crosslinking may be carried out at ordinary ambient temperature or at elevated temperature, depending on the temperature at which the particular crosslinking system selected is active in the particular elastomer combination employed.

The composition may further include, if desired, various appropriate additional compounding ingredients such as pigments such as carbon black, particulate inorganic fillers, extenders, tackifiers, stabilizers and antioxidants. It is not necessary nor desirable to add fibrous fillers to the present compositions.

Figure 1:
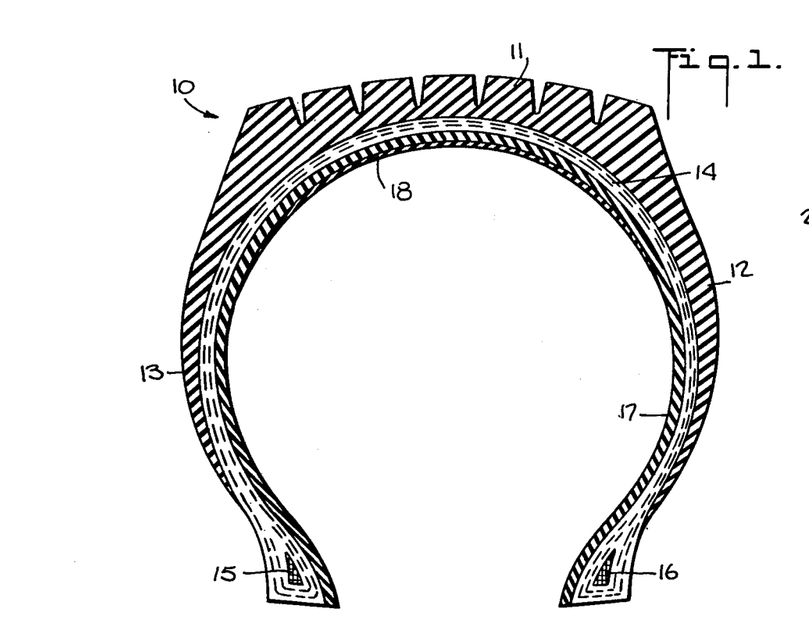
FIG. 1 is a largely diagrammatic sectional elevational view of a pneumatic tire embodying a puncture sealant layer in accordance with the invention.

In practicing the invention the ingredients are mixed together uniformly and the resulting mixture is incorporated in the tire in the form of a relatively thin (e.g. 0.1 inch) sealant layer. Referring to the drawing, and particularly to FIG. 1, a typical embodiment of the invention comprises a toroidal tubeless tire casing 10 having the usual vulcanized rubber tread 11 and sidewall portions 12, 13 surmounting a vulcanized rubber carcass 14 reinforced with filamentary material, which terminates at bead areas 15, 16 containing the usual circumferential inextensible reinforcement. The entire inside surface of the carcass is covered by the usual air-impervious line 17. A layer 18 of sealant material of the invention extends across the interior crown surface of the liner from one shoulder area of the tire to the other, and extends at least part way into each interior side wall area.

Figure 2:
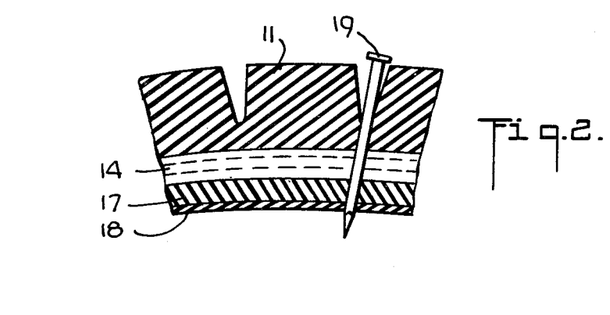
FIGS. 2 and 3 are enlarged fragmentary views similar to FIG. 2 illustrating the sealing action of the puncture sealant layer.
Figures 3, 4:
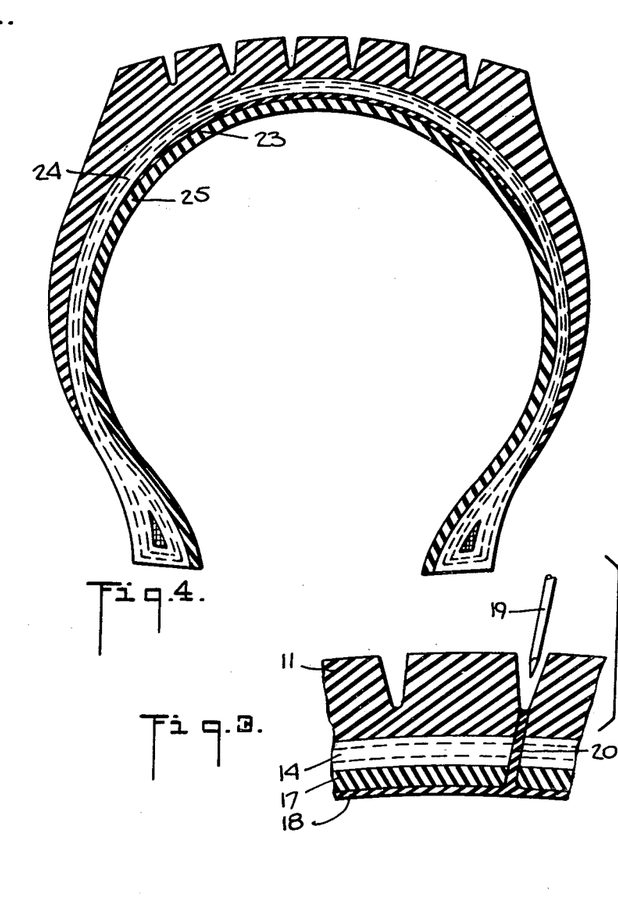
FIG. 4 is a view similar to FIG. 1 showing a modification of the invention.

The sealing action of the layer 18 is represented in FIGS. 2 and 3, wherein FIG. 2 shows a nail 19 puncturing the tire through the tread 11, carcass 14, liner 17 and sealant layer 18. The sealant composition tends to adhere to the nail and prevents loss of air pressure while the nail is in place. When the nail is withdrawn, as shown in FIG. 3, it tends to pull a plug 20 of the sealant composition into the puncture 21, thereby sealing the puncture against loss of air.

In a modification of the invention, as shown in FIG. 4, the puncture sealant layer 23 of the invention is disposed in between the inner surface of the carcass 24 and the liner 25. In such cases where the sealant layer is incorporated in the tire, it may be crosslinked before or after said incorporation. Similarly, the tire may be cured before or after incorporation of the selant layer.

In order to apply a sealant layer to the interior surface of a tire, the composition may be prepared as a solvent cement, for example as a solution in n-hexane or other suitable volatile organic solvent. This cement may be applied (e.g. sprayed or brushed) over the desired area of the inner surface of the tire liner, using as many coats as required to build up a desired thickness. Using the hydrocarbyl titanate curative system, the thus-applied sealant layer will become sufficiently crosslinked to perform the sealant function in about five days at room temperature, although the cure time may be shortened if desired by storing the tire in a warm place, e.g., at 50° to 100° C.

Another method is to extrude the heated sealant composition into a tire at elevated temperature in the form of a layer or strip having the desired thickness. Conveniently the composition may be extruded directly onto the liner surface from a suitably shaped die extending into the tire carcass, while rotating the tire. For extrusion at elevated temperatures, a curative system must be selected which will not react prematurely at the temperature of extrusion, but which will subsequently cure the composition at some temperature higher than the extrusion temperature. The tetrahydrocarbyl titanate ester cure of the puncture sealant represents a particularly advantageous practice of the invention in that with the tetrahydrocarbyl titanate ester curative it is possible to extrude the sealant at an elevated temperature without premature cure, and yet the cure of the applied sealant layer can be accomplished at a lower temperature (e.g. room temperature). The reason for this is that the titanate ester cure of the blend of elastomers will not take place unless hydrocarbyl alcohol (apparently formed as a by-product of the curing reaction) can escape from the composition. If the material is confined under non-evaporative conditions (e.g. in the barrel of an extruder) the cure will not take place, even at elevated temperature. However, after the blend is applied to the tire, the said hydrocarbyl alcohol is free to evaporate from the sealant layer, and the cure proceeds, even without any necessity for heating.

Alternatively, a previously prepared strip (e.g. an extruded strip) of sealant composition of suitable width and thickness may be applied by any suitable means to the interior of a tire.

The puncture sealing layer may if desired cover the entire interior surface of the tire from one bead or rim area to the other, in which case the liner may be omitted and the puncture sealing layer may serve as a liner.

In some cases it may be desirable to incorporate the sealant strip in the tire assembly as the tire is being manufactured, for example by laying down a strip of the sealant material on a tire building drum, and then superimposing the liner and other carcass components. The sealant layer may be prevented from adhering to the building drum by first placing a layer of flexible material on the drum followed by the sealant layer and then the remaining components of the tire. Thus the liner may first be placed on the tire building drum, followed by the sealant layer and carcass plies, to provide the type of construction shown in FIG. 4.

The puncture sealant ability and resistance to flow of the composition of the invention may be tested in an inflated tire. For this purpose the sealant is placed in the tire which is run at 75 to 90 mph and a load sufficient to generate an internal temperature of 200° F or higher. After running at high speed the tire is then observed to determine whether the sealant has flowed out of the shoulders of the tire and into the crown area or whether it has formed a puddle in the bottom of the tire after the tire was stopped. The ability to resist flow at at least 50 mph at an internal air temperature of at least 200° F is an important criterion of performance for the present invention. To evaluate puncture sealant ability, the tire is punctured with nails of various sizes, which are subsequently removed from the tire, and the loss of air pressure within the tire measured. Another important advantage of the present invention is the ability of the sealant composition to seal holes of at least 0.125 inch in diameter.

The following examples will serve to illustrate the practice of the invention in more detail.

EXAMPLE I 480 grams of natural rubber (Standard Malaysian Rubber, Mooney viscosity 64 ML-4-212° F., weight average molecular weight 4.7 × 10$^6$) was dissolved in 4 gallons of n-hexane. To this solution was added 960 grams of depolymerized natural rubber (DPR-400 [trademark], Hardman Company, viscosity 80,000 cps at 150° F.) and the mixture stirred until it is uniform. 100.8 grams of tetra-n-butyl titanate was added and the cement stirred once more. 24 grams of Antioxidant 2246 [trademark, American Cyanamid, 2,2'-methylene-bis(4-methyl-6-tert-butylphenol)] was added at this point. The resulting cement had a solids content of about 14%.

The cement was then coated onto the inside air-retaining liner of a HR 78-15 radial tire for a distance of 4 inches on either side of the center point up the inner sidewalls of the tire. The liner had first been cleaned by washing with soap and water, and then dried. The cement was laid down by painting thin successive layers until a weight of 1200 grams of dry solids was reached around the complete circumference of the tire. The solvent was allowed to evaporate overnight at room temperature and cure was completed by allowing the tire to sit at room temperature for 5 days. This process can be accelerated so that an equivalent cure can be attained by heating the tire for 24 hours at 200° F. After cure the gel content of the sealant composition was 35% as measured in toluene at room temperature compared to about 5% before cure.

The modified tire was tested by mounting it on a standard automobile rim, inflating it to 28 psi and running it on a Getty wheel, 11-inch diameter, for one hour at 50 miles per hour in order to thermally equilibrate the tire. Eight 20-penny nails (about 0.185 inch shank diameter) were then driven into each of the 6 grooves of the tire tread, from edge to edge, one through each groove and two others between lugs, so that the head of the nail could not be driven flush into the groove through a rib. The tire was then run an additional 20 hours at 50 miles per hour without an adjustment of the inflation pressure. During this period, there was little or no loss of air from the tire. All the nails were then removed and it was observed that there were holes in the tread of about the same diameter as the shanks of the nails. Most importantly, it was observed that during the removal and immediately thereafter, there was only a slight loss of inflation pressure (less than 4 psi) followed by complete sealing of all holes by the puncture sealant. The tire was then run an additional 10,000 miles (200 hours at 50 mph) during which period no further loss in inflation pressure was observed.

A similar tire containing no puncture sealant coating lost complete inflation pressure when subjected to the foregoing test, immediately after removal of the nails.

EXAMPLE II

A tire, in which the sealant, comprising 60% DPR-400 and 40% natural rubber, was applied by extrusion at 250° F. as a 0.100 inch layer to the inner liner of the tire, gave a result similar to the tire in which the sealant was applied from a solution. For extrusion, a mixture of 6 lbs. of DPR-400, 45 gms. Antioxidant 2246 and 6 lbs. of creamed Hevea natural rubber latex (67% total solids) were mixed in a double-arm sigma blade dough mixer at a shell temp. of 270° F. for 30 minutes. Vacuum was then applied and mixing continued for 30 minutes at which time the moisture content of the blend was less than 0.2%. The mixture was cooled to about 170° F. and 272 gms. of tetra-n-butyl titanate was added. The mixture was tightly closed and mixing continued for an additional 30 minutes. The resultant composition was then extruded at 250° F. as a 0.10 inch layer to the inner liner of a tire. The peak Mooney viscosity at 150° F. (large rotor, ML) of the fully cured sealant was 45.

EXAMPLE III

A sealant containing equal parts of natural rubber, DPR-400 and Struktol 30, along with 8% tetraisopropyl titanate and 1% Antioxidant 2246 (both based on total rubber) was mixed according to the procedure of the second sample. It was then extruded onto the liner of a tire as a 0.125 inch layer at 240° F. and cured by heating for 7 days at 150° F. The ML$_{peak}$ of the cured sealant at 150° F. was 35 and its gel content was 33.1% measured in toluene at 50° C. for 24 hours.

The tire was mounted on a rim and inflated. As a measure of sealing efficiency, four 20$d$ nails, 2½ inches long were driven into the tire, one in the outer rib, one in the outer groove and two in inner positions. The tire was then run on the Getty wheel, starting at 50 mph, for one hour periods at speed increments of 5 mph, until all the nails were ejected from the tire. All the holes, which in this test were the same diameter as the shank of the nail, sealed and no inflation was lost. A tire containing no sealant went flat within 1 minute after the first nail was ejected in this test.

EXAMPLE IV

A sealant identical to that of Example III, except that it contained 10% tetra-isopropyl titanate (based on total rubber) was extruded into each of four tires as a 0.125 inch strip and cured as above. The cured sealant had $ML_{peak}$ values at 150° F. ranging from 35 to 45 and gel contents of 18 to 25%. The tires were then mounted on a car, each with a 20d nail driven into an outside or inside tread position, and the car driven in 100 mile cycles at the following speeds, until the nails were ejected.

22.5 miles at 30 mph
37.5 miles at 50 mph
40 miles at 80 mph

For each tire, when the nail was ejected the hole sealed with little or no loss of inflation and the car was able to continue running. Uncoated tires, when tested similarly, lost inflation rapidly and went flat within one minute.

EXAMPLE V

A sealant containing 50 parts of natural rubber, 50 parts of DPR-400 and 70 parts of Piccadiene 2215 (a tackifying resin made from polymerized dicyclopentadiene, manufactured by Hercules, Inc.), plus 8% tetra-isopropyl titanate and 10% Antioxidant 2246 (based on total rubber) was mixed according to the procedure of the second example. It was then extruded at 250° F. as a 0.125 inch thick strip into a tire and cured. The puncture sealing efficiency of this material measured in the nail ejection test of Example III, showed an average sealing efficiency of 75% (3 out of 4 nail holes sealed).

EXAMPLE VI

A sealant composition containing 50 parts each of natural rubber and DPR-400, plus 50 parts of Piccopale 100 (a hydrocarbon polymer tackifying resin, Hercules, Inc.), 16% tetra-isopropyl titanate and 10% Antioxidant 2246 (based on the total rubber) was mixed and extruded into a tire at 250° F. as a 0.125 inch strip. Its sealing efficiency in the nail ejection test of Example III was greater than 75%.

EXAMPLE VII

A sealant mixture of 50 parts by weight each of natural rubber, DPR-400 and Struktol 30, plus 10 parts by weight of Antioxidant 2246 was extruded at 250° F. as a flat strip, 0.250 inch thick and 8 inches wide. It was then irradiated in a 1.4 million volt electron beam at a dosage of 20 megarads. The irradiated sample showed a gel content of 29.6% and an $ML_{peak}$ at 150° F. of 35. The strip was then incorporated on top of the liner in an uncured steel-belted radial tire which was cured in a conventional tire press. The tire gave 100% sealing efficiency in the nail ejection test of Example III.

EXAMPLE VIII

A sealant composition containing 40 parts by weight of natural rubber, 30 parts by weight of DPR-400 and 30 parts by weight of Struktol 30, along with 4.2 parts by weight of tetra-isopropyl titanate and 0.7 parts by weight of Antioxidant 2246 was mixed according to the procedure of the second example. It was then extruded into a tire at 240° F. as a 0.125 inch strip, cured and tested in the nail ejection test of Example III. Its average sealing efficiency was 70%.

EXAMPLE IX

Two parts of Butyl LM 430 (Enjay liquid polyisobutylene, viscosity average molecular weight 32,000, about 4 mole percent unsaturation) and one part EPDM (Uniroyal, Inc., ethylene-propylene-ethylidene norbornene terpolymer, 58/42 ethylene-propylene ratio, iodine number 20, ML-4=50 at 257° F.) were dissolved in hexane to yield a concentration of about 10%. 8 phr (based on the total rubber content) of tetra-n-butyl titanate was added and the mixture painted into the inside of a tire in an 8 inch width. Sufficient solution was used to leave a layer 0.125 inch in thickness when the solvent had completely evaporated. The sealant was allowed to cure by storage for at least 24 hours at room temperature after complete removal of solvent. The tire was inflated on a rim and then punctured in the thead with four nails of 0.125 inch diameter. The tire was then run 1000 miles at 50 mph on a Getty wheel and the nails then removed. There was less than 4 psi loss of inflation and the holes all sealed.

EXAMPLE X

A sealant composition containing equal parts of Butyl LM 430, EPDM and Piccolyte A100 (a polyterpene resin derived from alpha-pinene, softening point 100° C.), plus 6% tetra-n-butyl titanate (based on total rubber) was made up in hexane solution and painted into a tire to yield a strip 8 inches wide and 0.125 inch thick after evaporation. After curing at room temperature, the sealing efficiency of the coating was tested in the same manner as in Example IX, using 0.125 inch nails. Complete sealing after the nails were removed, with little or no loss of inflation, was found.

EXAMPLE XI

A sealant composition containing equal parts of EPDM, Butyl LM 430 and Piccodiene 2215, plus 10% tetra-n-butyl titanate (based on total rubber) was dissolved in hexane and painted into a tire to yield a strip 8 inches wide and 0.125 inch thick after evaporation. After being allowed to cure at room temperature, the tire was tested for sealing efficiency as in Example IX. Two nails of 0.125 diameter were used and when removed after 1000 miles, there was no loss of inflation.

EXAMPLE XII

A sealant composition containing equal parts of EPDM (ethylene-propylene-ethylidene norbornene terpolymer, iodine number 20, ML-4=55 at 257° F.), Butyl LM 430, and Struktol 30, plus 10% tetra-isopropyl titanate (based on the total rubber content) was dissolved in hexane and painted into a tire to yield a strip 8 inches wide and 0.125 inch thick when evaporated. The sealant was allowed to cure at room temperature, after which the tire was mounted on a rim and inflated to 28 psi. It was then punctured with two 20d nails and run at 50 mph for 20 hours. The nails were then pulled out with no loss of inflation being noted.

EXAMPLE XIII

A sealant containing 57 parts natural rubber, 43 parts DPR-400, 43 parts Struktol 30 and 21 parts Piccopale 100, plus 1% Antioxidant 2246 and 2.9% tetra-isopropyl titanate (both based on total rubber) was mixed according to the procedure of Example II. It was then extruded at 240° F. as a 0.125 inch strip, 8 inches wide, into a tire and cured. The puncture sealing efficiency of this material measured in the nail ejection test described in Example III, was 75%.

As is described in more detail in the above-mentioned copending application Ser. No. 557,712 of Frederick, C. Loveless (the disclosure of which is hereby incorporated herein by reference) the cure (crosslinking or gelling to an insoluble state) of unsaturated elastomer with an organo titanate ester takes place only when the mixture is exposed to the open atmosphere and can be prevented by maintaining the mixture in a closed system. The unsaturated elastomers that may be cured with titanate ester include cis-polyisoprene (whether natural or synthetic), polybutadiene, notably cis-polybutadiene, butadiene-styrene copolymer rubber, butadiene-acrylonitrile copolymer rubber, EPDM rubber (notably ethylene-propylene-5-ethylidene-2-norbornene terpolymer rubber having an iodine number greater than 8), polychloroprene rubber, butyl rubber (isoprene-isobutylene copolymer), and blends of such elastomers. The organo titanate esters employed as curatives or crosslinking agents to gel the unsaturated elastomer are tetrahydrocarbyl titanates of the formula $(RO)_4Ti$ where R is hydrocarbyl group, such as an alkyl group, e.g., an alkyl group having 1 to 12 carbon atoms, preferably 3 to 8 carbon atoms, or an aryl group having 6 to 10 carbon atoms, such as cresyl. In preparing the curable composition the mixing of the organo titanate ester crosslinking agent and unsaturated elastomer may be carried out under non-evaporative conditions in a closed system such as an internal mixer, e.g., a sigma blade mixer (such as a Baker-Perkins [trademark] or a closed Brabender mixer [trademark]. Alternatively, the organo titanate ester may be mixed with the unsaturated elastomer in solution in an inert volatile organic solvent for the elastomer (e.g., n-hexane), preferably in the presence of a small amount of volatile alcohol (e.g., ethyl alcohol) to suppress premature gellation. Gellation then occurs only after evaporation of the solvent and alcohol. In the most typical practice the mixing is carried out under conditions which suppress gellation (i.e., in a closed system under non-evaporative conditions, or in the presence of a volatile alcohol) and then, after the mixture has been shaped into the desired form (e.g., molded, extruded, coated, etc.), the mixture is permitted to gel simply by exposing to evaporative conditions in the open atmoshphere. Depending on the rubber and the amount of extraneous hydroxylic compounds such as antioxidants (hydroxylic compounds are inhibiting substances in the cure) it contains, the amount and type of titanate ester used dictate the rate and extent of cure obtained.

The temperature and time required for titanate cure again depend on the presence or absence of hydroxylic (inhibiting) additives and the type and level of titanate employed. Cure of the mixture is accompanied by evaporation of alcohol, corresponding to the alkoxy portion of the titanate ester. Hence, titanate esters of lower boiling alcohols effect cure more rapidly than titanate esters of higher boiling alcohols, e.g., isopropyl titanate acts more rapidly than butyl titanate which in turn acts more rapidly than ethylhexyl titanate. Elevated temperatures speed up the cure rate regardless of the type and level of titanate, although in the absence of added hydroxylic inhibitor and solvent cure is rapid at room temperature. In general, from 1 to 10 days are required for cure at room temperature depending on such factors as the nature of the rubber, the amount of hydroxylic impurity, the surface to volume ratio (the greater the surface exposed, the more rapid the cure), as well as the level and type of titanate ester. It is a remarkable feature of the cure that the curable mixture can be processed at elevated temperatures (under non-evaporative conditions) without premature cure, and yet cure can be accomplished at ambient temperatures (under evaporative conditions).

As indicated, it has been observed that the titanate curing reaction is accompanied by the evolution of alcohol, that is, an alcohol ROH corresponding to the organic group of the ester $(RO)_4Ti$ is generated during the cure. If the alcohol is prevented from evaporating, as in a closed container where non-evaporative conditions prevail, the cure will not go forward. However, when the curable composition is placed in the open atmosphere where evaporative conditions prevail, and the evolved alcohol ROH can escape, the cure proceeds. Thin sections such as coatings deposited from a solution, calendered or extruded films and sheets, and similar thin sections (e.g., 0.2 inch thick or less) have higher surface to volume ratio than thicker sections (such as most molded objects) and present greater opportunity for the generated alcohol ROH to escape. Therefore such thin sections cure more rapidly than thick sections.

As the titanate cure proceeds the gel content of the rubber (that is, the fraction insoluble in organic liquids that are normally solvents for the uncured elastomer) increases, indicating that crosslinking is taking place, and evolution of alcohol continues until a plateau of gel content is reached.

As indicated, hydroxylic additives have an inhibiting effect on the titanate cure. For instance phenolic antioxidants have been found to slow down the cure rate. When such antioxidants are removed as nearly as possible solutions of the rubbers tend to gel quickly when titanate esters are added. Normally, appreciable gellation occurs slowly upon evaporation of solvent from the solution. Addition of small amounts of volatile alcohol to solutions of rubber inhibits any tendency toward premature gellation. In fact, the rate of cure can be controlled by the molecular weight of the added alcohol. Low molecular weight alcohols such as ethyl alcohol have a mild or temporary inhibiting effect while higher boiling alcohols such as dodecyl alcohol have a more severe and lasting inhibiting effect. After gellation, the gelled rubber is insoluble to toluene and other organic solvents, but addition of acid such as acetic acid reverses the process and the rubber becomes soluble again. Addition of carboxylic acids likewise inhibits gel formation. It appears to be possible that the crosslinking is a consequence of titanate ester formation with the elastomer.

Preferred elastomers for use with the titanate cure are those selected from the group consisting of natural rubber, synthetic cis-polyisoprene, elastomer, cis-polybutadiene elastomer and ethylene-propylene-5-ethylidene-2-norbornene terpolymer rubber having an iodine number of at least 12, in low molecular weight (liquid) or high molecular weight (solid) form.

It will be understood that the measurements of gel content and Mooney viscosity set forth above for the final cured sealant material are obtainable on a separate sample of the sealant composition which has been subjected to curing conditions substantially equivalent to those which the final sealant material is subjected; it is of course not practical to make these measurements on an actual material in use in the tire itself.

We claim:

1. A puncture sealing composition for a tubeless pneumatic tire comprising a fiber-free blend of
   A. a major proportion by weight of a low molecular weight liquid elastomer in admixture with a tackifying or plasticizing substance, and
   B. a minor proportion by weight of a high molecular weight solid elastomer,
   and a crosslinking agent for the elastomers in amount effective to partially crosslink the elastomers to an extent sufficient to prevent the blend from flowing at elevated temperatures and centrifugal forces encountered in the tire in use, the blend having in the partially crosslinked state sufficient adhesion and conformability to function as a sealant in the tire, the amount of (A) being from more than 50% to 90% by weight and the amount of (B) being correspondingly from less than 50% to 10% by weight, based on the combined weights of (A) and (B), the said low molecular weight elastomer being a liquid rubber having a Brookfield viscosity at 150° F of from 20,000 to 2,000,000 cps and the said high molecular weight elastomer having a Mooney viscosity of from 20 to 160 ML-4 at 212° F, the said crosslinking agent being selected from the following, present in the amounts recited:
   from more than 0.5 to 2.0 parts of sulfur or sulfur-yielding curative;
   from more than 0.5 to 2.0 parts of quinoid curative;
   from 0.1 to 1.0 part of radical generating curative;
   from 2 to 10 parts of polyisocyanate curative; and
   from 2 to 10 parts of tetrahydrocarbyl titanate ester curative,
   the said parts of crosslinking agent being by weight based on 100 parts of the combined weight of the two elastomers, the gel content of the blend in the partially crosslinked state being from 15 to 60% by weight of the blend, as measured in toluene at room temperature, and the peak Mooney viscosity of the blend in the partially crosslinked state being from 30 to 55 ML at 150° F.

2. A puncture sealing composition as in claim 1 in which the liquid rubber is heat depolymerized natural rubber.

3. A puncture sealing composition as in claim 1 in which the low molecular weight elastomer is selected from the group consisting of liquid cis-polyisoprene, liquid polybutadiene, liquid polybutene, liquid ethylene-propylene-non-conjugated diene terpolymer rubber, and liquid isobutylene-isoprene copolymer rubber.

4. A puncture sealing composition as in claim 1 in which the high molecular weight elastomer is selected from the group consisting of conjugated diolefin homopolymer rubbers, copolymers of a major proportion of a conjugated diolefin with a minor proportion of a copolymerizable monoethylenically unsaturated monomer, copolymers of isobutylene with a small amount of isoprene, ethylene-propylene-non-conjugated diene terpolymers, and saturated elastomers.

5. A puncture sealing composition as in claim 1 in which (A) is liquid heat depolymerized natural rubber in admixture with a resin prepared from the reaction of a mineral oil purification residue with formaldehyde and with nitric acid catalyst and (B) is solid cis-polyisoprene rubber.

6. A puncture sealing composition as in claim 1 in which the tackifying or plasticizing substance is selected from resin esters, aliphatic petroleum hydrocarbon resins, polyterpene resins, styrene resins, dicyclopentadiene resins, and resins prepared from the reaction of a mineral oil purification residue with formaldehyde and with a nitric acid catalyst.

7. A puncture sealing composition for a tubeless pneumatic tire comprising a blend of
   A. from more than 50% to 90% by weight of low molecular weight liquid elastomer having a Brookfield viscosity at 150° F of from 20,000 to 1,000,000 cps in admixture with a plasticizing or tackifying substance, and
   B. correspondingly from less than 50% to 10% by weight of high molecular weight solid elastomer having a Mooney viscosity of from 20 to 160 ML-4 at 212° F,
   said blend being partially crosslinked to an extent sufficient to provide in the blend a gel content of from 20 to 50% by weight of the blend as measured in toluene at room temperature and a peak Mooney viscosity of from 40 to 50 ML at 150° F, whereby the blend is prevented from flowing at elevated temperatures and centrifugal forces encountered in the tire in use and the blend has sufficient adhesion and conformability to function as a sealant in the tire.

8. A puncture sealing composition as in claim 7 in which the said partial crosslinking is effected by subjecting the said blend to electron radiation.

9. A puncture sealing composition as in claim 7, devoid of fibrous filler, in which the said high molecular weight solid elastomer is selected from the group consisting of conjugated diolefin homopolymer rubbers, copolymers of a major proportion of conjugated diolefin with a minor proportion of a copolymerizable monoethylenically unsaturated monomer, copolymers of isobutylene with a small amount of isoprene, ethylene-propylene-non-conjugated diene terpolymers, and saturated elastomers.

10. A puncture sealing composition for a tubeless pneumatic tire comprising a blend of
    A. from more than 50% to 90% by weight of a low molecular weight liquid elastomer having a Brookfield viscosity at 150° F of from 20,000 to 1,000,000 cps in admixture with a plasticizing or tackifying substance, and
    B. correspondingly from less than 50% to 10% by weight of a high molecular weight solid elastomer having a Mooney viscosity of from 20 to 160 ML-4 at 212° F,
    and from 2 to 10 parts, per 100 parts by weight of the two elastomers, of a tetraalkyl titanate ester crosslinking agent in which the alkyl groups have from 1 to 12 carbon atoms,
    said blend being partially crosslinked by the said crosslinking agent to provide in the blend a gel content of from 20% to 50% by weight based on the weight of the blend as measured in toluene at room temperature and a peak Mooney viscosity of from 40 to 50 ML at 150° F, whereby the blend is prevented from flowing at elevated temperatures and centrifugal forces encountered in the tire in use and the blend has sufficient adhesion and conformability to function as a sealant in the tire.

11. A puncture sealing composition as in claim 10 in which the alkyl groups in the said tetraalkyl titanate ester crosslinking agent have from 3 to 8 carbon atoms, the amount of said titanate ester is from 2.5 to 8 parts per 100 parts by weight of the two elastomers, and the composition is devoid of fibrous filler.

12. A puncture sealing composition for a tubeless pneumatic tire comprising a blend of
A. from more than 50% to 90% by weight of liquid heat depolymerized natural rubber having a Brookfield viscosity at 150° F of from 20,000 to 2,000,000 cps in admixture with a plasticizing or tackifying substance, and
B. correspondingly from less than 50% to 10% by weight of cis-polyisoprene elastomer having a Mooney viscosity of from 20 to 160 ML-4 at 212° F,
said blend being partially crosslinked to an extent sufficient to provide in the blend a gel content of from 15 to 60% by weight of the blend as measured in toluene at room temperature and a peak Mooney viscosity of from 30 to 55 ML at 150° F, whereby the blend is prevented from flowing at elevated temperatures and centrifugal forces encountered in the tire in use and the blend has sufficient adhesion and conformability to function as a sealant in the tire.

13. A puncture sealing composition for a tubeless pneumatic tire comprising a blend of
A. from more than 50% to 90% by weight of liquid heat depolymerized natural rubber having a Brookfield viscosity at 150° F of from 20,000 to 1,000,000 cps and a resin prepared from the reaction of a mineral oil purification residue with formaldehyde and with nitric acid catalyst with
B. correspondingly from less than 50% to 10% by weight of cis-polyisoprene elastomer having a Mooney viscosity of from 20 to 160 ML-4 at 212° F,
and from 2 to 10 parts, per 100 parts by weight of the two elastomers, of a tetraalkyl titanate ester crosslinking agent in which the alkyl groups have from 1 to 12 carbon atoms,
said blend being partially crosslinked by the said crosslinking agent to provide in the blend a gel content of from 15 to 60% by weight based on the weight of the blend as measured in toluene at room temperature and a peak Mooney viscosity of from 40 to 50 ML at 150° F, whereby the blend is prevented from flowing at elevated temperatures and centrifugal forces encountered in the tire in use and the blend has sufficient adhesion and conformability to function as a sealant in the tire.

14. A puncture sealing composition as in claim 13 in which the gel content of the blend is from 20 to 50% by weight based on the weight of the blend as measured in toluene at room temperature, the alkyl groups in the said tetraalkyl titanate ester crosslinking agent have from 3 to 8 carbon atoms, and the amount of tetraalkyl titanate crosslinking agent is from 3 to 8 parts per 100 parts by weight of the two elastomers.

15. A puncture sealing composition as in claim 13 in which the tetraalkyl titanate ester crosslinking agent is tetra-n-butyl titanate.

16. A puncture sealing tubeless pneumatic tire having a vulcanized rubber tread portion surmounting a vulcanized rubber carcass portion reinforced with filamentary material, said carcass portion having a crown area underlying the tread, and having sidewall portions extending from shoulder areas at the edges of the crown area to bead areas containing inextensible circumferential reinforcement, and a puncture sealing layer inside the tire disposed across the crown area of the tire and extending at least from one shoulder area to the other, said puncture sealing layer comprising a fiber-free blend of
A. a major proportion by weight of a low molecular weight liquid elastomer in admixture with a tackifying or plasticizing substance, and
B. a minor proportion by weight of a high molecular weight solid elastomer,
said blend being partially crosslinked to an extent sufficient to prevent the blend from flowing at elevated temperatures and centrifugal forces encountered in the tire in use, the partially crosslinked blend having sufficient adhesion and conformability to function as a sealant in the tire, the amount of (A) being from more than 50% to 90% by weight and the amount of (B) being correspondingly from less than 50% to 10% by weight, based on the combined weights of the two elastomers, the said low molecular weight elastomer being a liquid rubber having a Brookfield viscosity at 150° F of from 20,000 to 2,000,000 cps and the said high molecular weight elastomer having a Mooney viscosity of from 20 to 160 ML-4 at 212° F, the said composition containing a crosslinking agent selected from the following, present in the amounts recited:
from more than 0.5 to 2.0 parts of sulfur or sulfur-yielding curative;
from more than 0.5 to 2.0 parts of quinoid curative;
from 0.1 to 1.0 part of radical generating curative;
from 2 to 10 parts of polyisocyanate curative; and
from 2 to 10 parts of tetrahydrocarbyl titanate ester curative,
the said parts of crosslinking agent being by weight based on 100 parts of the combined weight of the two elastomers, the gel content of the blend in the partially crosslinked state being from 15 to 60% by weight of the blend, as measured in toluene at room temperature, and the peak Mooney viscosity of the blend in the partially crosslinked state being from 30 to 55 ML at 150° F.

17. A tire as in claim 16 in which the tackifying or plasticizing substance is selected from rosin esters, aliphatic petroleum hydrocarbon resins, polyterpene resins, styrene resins, dicyclopentadiene resins, and resins prepared from the reaction of a mineral oil purification residue with formaldehyde and with a nitric acid catalyst.

18. A tire as in claim 16 in which the said puncture sealing layer is disposed on the inside surface of the said liner.

19. A tire as in claim 16 in which the said sealing layer is sandwiched between the liner and the inside surface of the carcass.

20. A tire as in claim 16 in which the liquid rubber is heat depolymerized natural rubber.

21. A tire as in claim 16 in which the low molecular weight elastomer is selected from the group consisting of liquid cis-polyisoprene, liquid polybutadiene, liquid polybutene, liquid ethylene-propylene-non-conjugated diene terpolymer rubber, and liquid isobutylene-isoprene copolymer rubber.

22. A tire as in claim 16 in which the high molecular weight elastomer is selected from the group consisting of conjugated diolefin homopolymer rubbers, copolymers of a major proportion of a conjugated diolefin with a monomer proportion of a copolymerizable monoethylenically unsaturated monomer, copolymers of isobutylene with a small amount of isoprene, ethylene-propylene-non-conjugated diene terpolymers, and saturated elastomers.

23. A tire as in claim 16 in which the low molecular weight elastomer is liquid heat depolymerized natural rubber and the high molecular weight elastomer is solid cis-polyisoprene rubber.

24. A puncture sealing tubeless pneumatic tire having a vulcanized rubber tread portion surmounting a vulcanized rubber carcass portion reinforced with filamentary material, said carcass portion having a crown area underlying the tread, and having sidewall portions extending from shoulder areas at the edges of the crown area to bead areas containing inextensible circumferential reinforcement, and a puncture sealing layer inside the tire disposed across the crown area of the tire and extending at least from one shoulder area to the other, said puncture sealing layer comprising a blend of
A. from more than 50 to 90% by weight of a low molecular weight liquid elastomer having a Brookfield viscosity at 150° F of from 20,000 to 1,000,000 cps and a tackifying or plasticizing substance with
B. correspondingly from less than 50 to 10% by weight of a high molecular solid elastomer having a Mooney viscosity of from 20 to 160 ML-4 at 212° F,
said blend being partially crosslinked to an extent sufficient to provide in the blend a gel content of from 15 to 60% by weight of the blend as measured in toluene at room temperature and a peak Mooney viscosity of from 40 to 50 ML at 150° F, whereby the blend is prevented from flowing at elevated temperatures and centrifugal forces encountered in the tire in use and the blend has sufficient adhesion and conformability to function as a sealant in the tire.

25. A tire as in claim 24, in which the said blend is devoid of fibrous filler, and in which the said high molecular weight elastomer is selected from the group consisting of conjugated diolefin homopolymer rubbers, copolymers of a major proportion of a conjugated diolefin with a minor proportion of a copolymerizable monoethylenically unsaturated monomer, copolymers of isobutylene with a small amount of isoprene, ethylene-propylene-non-conjugated diene terpolymers, and saturated elastomers.

26. A puncture sealing tubeless pneumatic tire having a vulcanized rubber tread portion surmounting a vulcanized rubber carcass portion reinforced with a filamentary material, said carcass portion having a crown area underlying the tread, and having sidewall portions extending from shoulder areas at the edges of the crown area to bead areas containing inextensible circumferential reinforcement, the interior surface of the tire being covered with an air-impervious liner, and a puncture sealing layer inside the tire disposed across the crown area of the tire and extending at least from one shoulder area to the other, said puncture sealing layer comprising a blend of
A. from more than 50 to 90% by weight of a low molecular weight liquid elastomer having a Brookfield viscosity at 150° F of from 20,000 to 1,000,000 cps in admixture with a tackifying or plasticizing substance, and
B. correspondingly from less than 50 to 10% by weight of a high molecular weight solid elastomer having a Mooney viscosity of from 20 to 160 ML-4 at 212° F,
and from 2.5 to 10 parts, per 100 parts by weight of the two elastomers, of a tetraalkyl titanate ester crosslinking agent in which the alkyl groups have from 1 to 12 carbon atoms,
said blend being partially crosslinked by the said crosslinking agent to provide in the blend a gel content of from 20 to 50% by weight based on the weight of the blend as measured in toluene at room temperature and a peak Mooney viscosity of from 40 to 50 ML at 150° F, whereby the blend is prevented from flowing at elevated temperatures and centrifugal forces encounterd in the tire in use and the blend has sufficient adhesion and conformability to function as a sealant in the tire.

27. A tire as in claim 26 in which the alkyl groups in the said tetraalkyl titanate ester crosslinking agent have from 3 to 8 carbon atoms, the amount of said titanate ester is from 2.5 to 8 parts per 100 parts by weight of the two elastomers, and the composition is devoid of fibrous filler.

28. A puncture sealing tubeless pneumatic tire having a vulcanized rubber tread portion surmounting a vulcanized rubber carcass portion reinforced with filamentary material, said carcass portion having a crown area underlying the tread, and having sidewall portions extending from shoulder areas at the edges of the crown area to bead areas containing inextensible circumferential reinforcement, and a puncture sealing layer inside the tire and extending at least from one shoulder area to the other, said puncture sealing layer comprising a blend of
A. from more than 50 to 90% by weight of liquid heat depolymerized natural rubber having a Brookfield viscosity at 150° F of from 20,000 to 1,000,000 cps and a resin prepared from the reaction of a mineral oil purification residue with formaldehyde and with nitric acid catalyst with
B. correspondingly from less than 50 to 10% by weight of cis-polyisoprene elastomer having a Mooney viscosity of from 20 to 160 ML-4 at 212° F,
said blend being partially crosslinked to an extent sufficient to provide in the blend a gel content of from 15 to 60% by weight of the blend as measured in toluene at room temperature and a peak Mooney viscosity of from 30 to 55 ML at 150° F, whereby the blend is prevented from flowing at elevated temperature and centrifugal forces encountered in the tire in use and the blend has sufficient adhesion and conformability to function as a sealant in the tire.

29. A puncture sealing tubeless pneumatic tire having a vulcanized rubber tread portion surmounting a vulcanized rubber carcass portion reinforced with filamentary material, said carcass portion having a crown area underlying the tread, and having sidewall portions extending from shoulder areas at the edges of the crown area to bead areas containing inextensible circumferential reinforcement, the interior surface of the tire being covered with an air-impervious liner, and a puncture sealing layer inside the tire disposed across the crown area of the tire and extending at least from one shoulder area to the other, said puncture sealing layer comprising a blend of
A. from more than 50 to 90% by weight of liquid heat depolymerized natural rubber having a Brookfield viscosity at 150° F of from 20,000 to 1,000,000 cps and a resin prepared from the reaction of a mineral oil purification product with formaldehyde and with nitric acid catalyst with B. correspondingly from less than 50% to 10% by weight of cis-polyisoprene elastomer having a Mooney viscosity of from 20 to 160 ML-4 at 212° F, and from 2 to 10 parts, per 100 parts by weight of the two elastomers, of a tetraalkyl titanate ester crosslinking agent in which the alkyl groups have from 1 to 12 carbon atoms, said blend being partially crosslinked by the said crosslinking agent to provide in the blend a gel content of from 15 to 60% by weight based on the weight of the blend as measured in toluene at room temperature and a peak Mooney viscosity of from 40 to 50 ML at 150° F, whereby the blend is prevented from flowing at elevated temperatures and centrifugal forces encountered in the tire in use and the blend has suffficient adhesion and conformability to function as a sealant in the tire.

30. A tire as in claim 29 in which the gel content of the blend is from 20 to 50% by weight based on the weight of the blend as measured in toluene at room temperature, the alkyl groups in the said tetraalkyl titanate ester crosslinking agent have from 3 to 8 carbon atoms, and the amount of tetraalkyl titanate crosslinking agent is from 2.5 to 8 parts per 100 parts by weight of the two elastomers.

31. A tire as in claim 30 in which the tetraalkyl titanate ester crosslinking agent is tetra-n-butyl titanate.

32. A tire as in claim 24 in which the said partial crosslinking is effected by subjecting the said blend to electron radiation.

33. A tire as in claim 30 in which the tetraalkyl titanate ester crosslinking agent is tetrapropyl titanate.

* * * * *